June 21, 1960 J. J. BILLIN 2,942,063

AUTOMATIC GAIN CONTROL CIRCUITS FOR TELEVISION RECEIVERS

Filed June 23, 1958

Inventor
J. J. Billin
By Mascock Downing & Seebold
Attys.

United States Patent Office 2,942,063

Patented June 21, 1960

2,942,063

AUTOMATIC GAIN CONTROL CIRCUITS FOR TELEVISION RECEIVERS

James John Billin, Isleworth, England, assignor to Electric & Musical Industries Limited, Hayes, England, a British company Filed June 23, 1958, Ser. No. 743,705

Claims priority, application Great Britain June 25, 1957

6 Claims. (Cl. 178—7.3)

Figure 1:
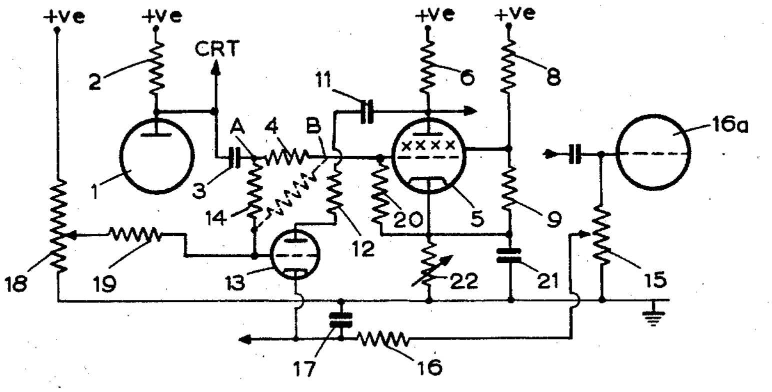

This invention relates to automatic gain control circuits for television receivers and is an improvement in or modification of the invention described in the specification of U.S. Patent No. 2,885,472, of which I was a co-inventer.

In the specification of said patent automatic gain control circuits for television receivers are described in which a separator is employed arranged to separate demodulated synchronising pulses from vision signals and in which the synchronising pulses and vision signals are fed through one path to the input of the separator and through a second and separate path including an impedance to one electrode of a rectifier which forms a level measuring device and voltage pulses corresponding to the synchronising pulses appearing at the output of said separator are fed to the scanning circuit of the receiver and back to the said electrode of the rectifier to oppose the synchronising pulses fed thereto from the second path so that one extremity of the resultant signals corresponds to minimum vision modulation, the rectifier measuring said resultant signals to provide automatic gain control potentials.

With the circuits described in the specification of said patent there is a possibility of the synchronising signals from the separator, which are applied to the same electrode of the rectifier as the mixture of synchronising pulses and vision signals, being fed back into the circuit feeding the mixture of synchronising pulses and vision signals to the rectifier.

The object of the present invention is to provide an improvement in or modification of the circuits described in the specification of said patent with a view to reducing this possibility.

According to the invention there is provided in a television receiver an automatic gain control circuit comprising a separator having an input electrode and an output electrode, a path for feeding a mixture of demodulated vision and synchronising pulses to the input electrode of said separator, means for deriving synchronising pulses separated from vision signals from the output electrode of said separator, a unidirectionally conducting device having at least two input electrodes, means for feeding said synchronising pulses from the output electrode of said separator through an impedance to one input electrode of said device, a second impedance connecting said path to said device to feed said demodulated vision and synchronising pulses to the other input electrode of said device, means whereby said impedances cause at said device the synchronising pulses fed from said separator to oppose the synchronising pulses fed through said second impedance thereby to cause one extremity of the resultant signals to correspond to minimum vision modulation and means whereby said device rectifies the peaks of said resultant signals to provide automatic gain control potentials.

The unidirectionally conducting device which functions as a level measuring device may comprise a triode valve and the mixture of the synchronising pulses and vision signals may be fed to the control electrode of said valve and the synchronising pulses from the separator may be fed to the anode of said valve or alternatively the last mentioned pulses may be fed to the control electrode of said valve and the mixture of synchronising pulses and vision signals fed to the anode of said valve.

Figure 2:
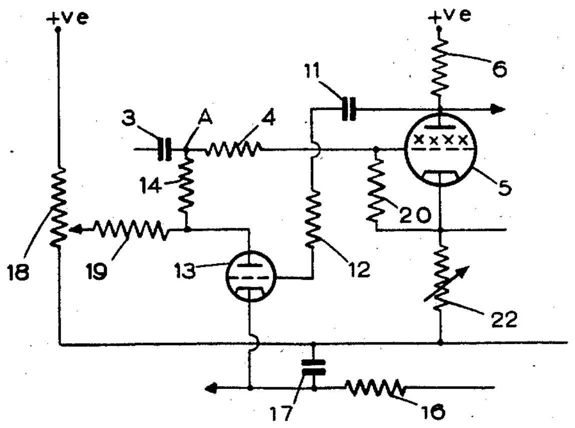

In order that the said invention may be clearly understood and readily carried into effect, it will now be more fully described with reference to the accompanying drawings, in which:

Figure 1 is an automatic gain control circuit for a television receiver in accordance with one embodiment of the invention, and Figure 2 illustrates a portion of the circuits shown in Figure 1 in accordance with another embodiment of the invention.

The circuit shown in Figure 1 of the drawings is similar to Figure 1 shown in the specification of the said co-pending application modified by the circuit shown in Figure 7 thereof although it will be appreciated that the present invention can be applied to all of the embodiments of the invention described in the specification of said patent. The circuit shown in the present Figure 1 functions in the manner described in the specification of said co-pending application and the various circuit components shown have been given the same reference numerals as those in Figures 1 and 7 of the specification of said patent so that a full description thereof herein is considered unnecessary. The circuit shown in Figure 1 of the drawings of the present specification differs from that shown in the specification of said patent in that instead of employing a diode rectifier 13 a triode valve 13 is employed and the mixture of the synchronising pulses and vision signals from the valve 1 are fed through the condenser 3 and resistance 14 to the control electrode of the valve 13 whilst the synchronising pulses from the separator 5 are fed through the condenser 11 and resistance 12 to the anode of the valve 13. The valve 13 functions as a peak rectifier or level measuring device and the synchronising pulses appearing in the mixture fed to the control electrode of the valve 13 are opposed by the synchronising pulses fed to the anode of the valve so that one extremity of the resultant signals corresponds to minimum vision modulation. The valve 13 serves to rectify or measure the resultant signals so as to set up automatic gain control potentials. The manual control of gain can be effected as described in the specification of said co-pending application by feeding a voltage to the control electrode of the valve 13 from a tapping point on a potentiometer 18.

Alternatively manual control of gain can be effected by varying the potential of the cathode of valve 5 by means of the variable resistance 22, in the manner described with reference to Figure 7 in the specification of said co-pending application.

In Figure 2 of the accompanying drawings the synchronising pulses from the separator 5 are fed to the control electrode of the valve 13 whilst the mixture of the synchronising pulses and vision signals from the valve 1 is fed to the anode of the valve 13, and in this case manual gain control can be obtained from a tapping point on the potentiometer 18 which is connnected to the anode of the valve 13 or by adjustment of variable resistance 22.

What I claim is:

1. In a television receiver the provision of an automatic gain control circuit comprising a separator having an input electrode and an output electrode, a path for feeding a mixture of demodulated vision and synchronising pulses to the input electrode of said separator, means for deriving synchronising pulses separated from vision signals from the output electrode of said separator, a unidirectionally conducting device having at least two input electrodes, means for feeding said synchronising pulses from the output electrode of said separator through an impedance to one input electrode of said device, a second impedance connecting said path to said device to feed said demodulated vision and synchronising pulses to the other input electrode of said device, means whereby said impedances cause at said device the synchronising pulses fed from said separator to oppose the synchronising pulses fed through said second impedance thereby to cause one extremity of the resultant signal to correspond to minimum vision modulation and means whereby said device rectifies the peaks of said resultant signals to provide automatic gain control potentials.

2. A circuit according to claim 1 wherein said device has a cathode and two further electrodes and said mixture and the separated synchronising pulses are fed respectively to said further electrodes.

3. In a television receiver the provision of an automatic gain control circuit comprising a separator having an input electrode and an output electrode, a path for feeding demodulated vision and synchronising pulses to the input electrode of said separator, means for deriving synchronising pulses separated from vision signals from the output electrode of said separator, a unidirectionally conducting device having a cathode, a control electrode and an anode, means for feeding said synchronising pulses from the output electrode of said separator through an impedance to the anode of said device, a second impedance connecting said path to said device to feed said demodulated vision and synchronising pulses to the control electrode of said device, means whereby said impedances cause at said device the synchronising pulses fed from said separator to oppose the synchronising pulses fed through said second impedance thereby to cause one extremity of the resultant signals to correspond to minimum vision modulation and means whereby said device rectifies the peaks of said resultant signals to provide automatic gain control potentials.

4. In a television receiver according to claim 3, wherein means are provided for applying a manually variable gain control potential to said control electrode.

5. In a television receiver the provision of an automatic gain control circuit comprising a separator having an input electrode and an output electrode, a path for feeding demodulated vision and synchronising pulses to the input electrode of said separator, means for deriving synchronising pulses separated from vision signals from the output electrode of said separator, a unidirectionally conducting device having a cathode, a control electrode and an anode, means for feeding said synchronising pulses from the output electrode of said separator through an impedance to the control electrode of said device, a second impedance connecting said path to said device to feed said demodulated vision and synchronising pulses to the anode of said device, means whereby said impedances cause at said device the synchronising pulses fed from said separator to oppose the synchronising pulses fed through said second impedance thereby to cause one extremity of the resultant signals to correspond to minimum vision modulation and means whereby said device rectifies the peaks of said resultant signals to provide automatic gain control potentials.

6. In a television receiver according to claim 5, wherein means are provided for applying a manually variable gain control potential to said anode.

No references cited.